United States Patent [19]
Deckert

[11] 3,786,536
[45] Jan. 22, 1974

[54] MEANS FOR CUTTING AND TENDERIZING MEATS

[75] Inventor: Robert Deckert, Acton, Mass.

[73] Assignee: Sir Steak Machinery, Inc., Boxboro, Mass.

[22] Filed: May 8, 1972

[21] Appl. No.: 251,076

[52] U.S. Cl. .................................................. 17/25
[51] Int. Cl. .............................................. A22c 9/00
[58] Field of Search ............................ 17/25–31, 52; 83/30, 44, 469

[56] References Cited
UNITED STATES PATENTS

| 183,273 | 10/1876 | Smith | 17/26 |
| 1,007,721 | 11/1911 | Meyer | 17/27 UX |
| 2,291,809 | 8/1942 | Jackson | 17/27 X |
| 2,482,991 | 9/1949 | Stukart | 17/25 |
| 2,547,234 | 4/1951 | Spang | 17/26 |
| 3,222,712 | 12/1965 | Decker | 17/26 |

Primary Examiner—Louis G. Mancene
Assistant Examiner—D. L. Weinhold
Attorney, Agent, or Firm—C. Yardley Chittick et al.

[57] ABSTRACT

A machine which simultaneously cuts a slab of meat into strips through the use of a first group of rotating spaced disc cutters mounted on a first rotating shaft and simultaneously the meat is penetrated by a second group of rotating radially extending penetrating blades mounted on a second rotating shaft. The peripheral speed of the disc cutters is always greater than the peripheral speed of the penetrating blades. Means compelling passage of the disc cutters completely through the meat is an essential feature.

17 Claims, 11 Drawing Figures

3,786,536

MEANS FOR CUTTING AND TENDERIZING MEATS

BACKGROUND OF THE INVENTION

The art relating to machines for tenderizing meat is old and well known. Patents relating to this subject may be found in the U.S. Patent Office in Class 17, Butchering, Sub-classes 25 to 31. Machines in common use are designed to slit or puncture the meat surfaces with the cuts or punctures being so arranged that the slab of meat being tenderized remains as a single piece. Machines have also been designed for simultaneously cutting a slab of meat into a plurality of strips. Other machines have been designed to slit the slab of meat on one side while puncturing it on the other. In other arrangements, the meat has been simultaneously slit on both sides or simultaneously punctured on both sides. As far as I am aware, however, no machine, such as that hereinafter described and claimed, has been developed having the capability of puncturing the slab of meat on one side while simultaneously cutting it into strips through the use of disc cutters entering the meat from the opposite side.

SUMMARY OF THE INVENTION

The present invention comprises a machine which will tenderize a slab of meat by puncturing it on one side through the use of a plurality of aligned penetrating blades mounted on a rotating shaft while simultaneously cutting the meat into a plurality of strips of selected width through the use of a plurality of spaced disc cutters mounted on an adjacent parallel shaft. The arrangement is such that the disc cutters always rotate at a higher peripheral speed than the rotating penetrating blades so that the necessary sliding cutting action of the disc cutters will always be present. The machine includes conventional guides for directing the meat along a proper path.

The invention also includes special mechanism for supporting the meat on the side opposite the circular disc cutters at positions very closely adjacent each cutter whereby each cutter will function with precision to cut the meat cleanly all the way through even though the penetrating blades are simultaneously functioning to puncture the meat at positions closely adjacent each side of each circular disc cutter.

The machine of the present invention is not only adapted to produce tenderized strips of meat, but also is capable of producing small cubes of meat which have been further tenderized by a second puncturing by the penetrating blades either on the same side as the original punctures, or on one of the other sides. The cubing of the meat is accomplished by collecting the originally cut strips and feeding them into the machine in horizontal position. The resulting meat cubes when cooked will be extremely tender.

The invention also includes a novel construction of the penetrating blades in which each of the blades has a passage therethrough so that a suitable fluid for tenderizing, flavoring or preserving the meat may be forced therein simultaneously with the creation of the tenderizing punctures.

These and other objects of the invention will become more apparent as the machine is described in more detail hereinafter.

DESCRIPTION OF THE PREFERRED EMBODIMENT

Figure 1:
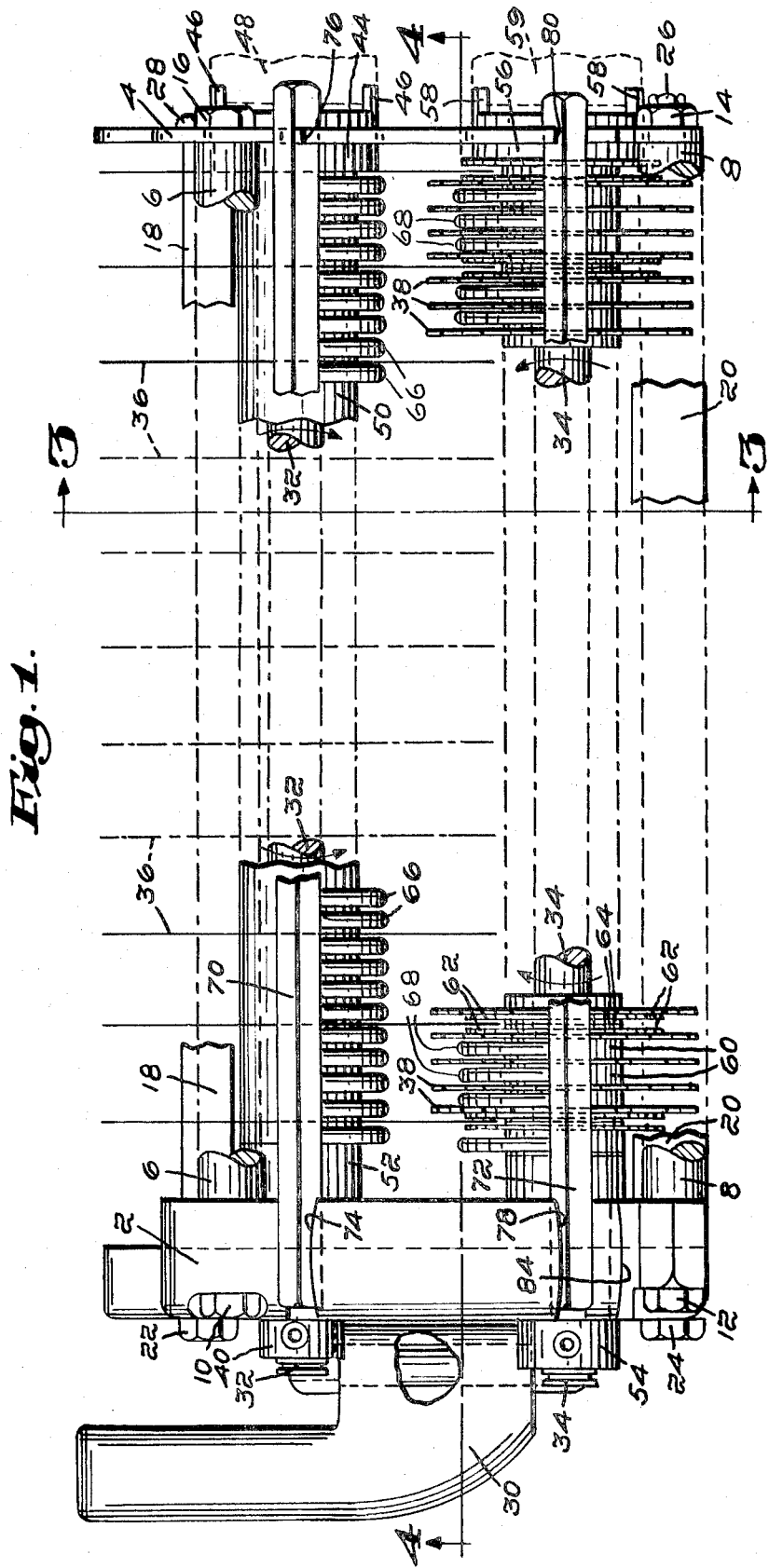
FIG. 1 is a plan view of the machine in which parts have been broken away for simplicity in illustration.

Referring first to FIG. 1, which is a plan view of the machine, it will be understood that this is a complete unit which is insertable in and removable from the conventional housing, not shown. See the U.S Pat. to Deckert No. 3,222,712. The housing customarily includes a motor and driving means for the two shafts carrying the disc cutters and the penetrating blades. Additionally, the housing will preferably have a transparent protective cover with a passage therethrough permitting downward introduction of the meat to the machine while protecting the user's fingers from possible injury. The housing will also include a collecting platform for receiving the initially tenderized strips and the subsequently cut cubes.

Figure 3:
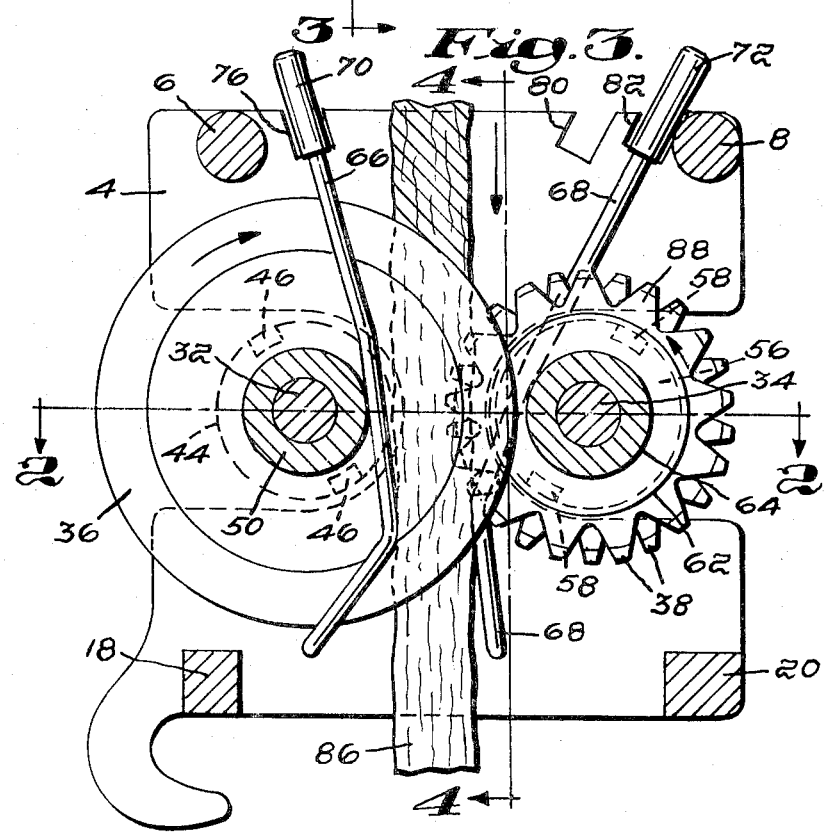
FIG. 3 is a vertical section taken on the line 3—3 of FIG. 1 and line 3—3 of FIG. 2 showing in addition in the background part of the supporting frame structure.
Figure 4:
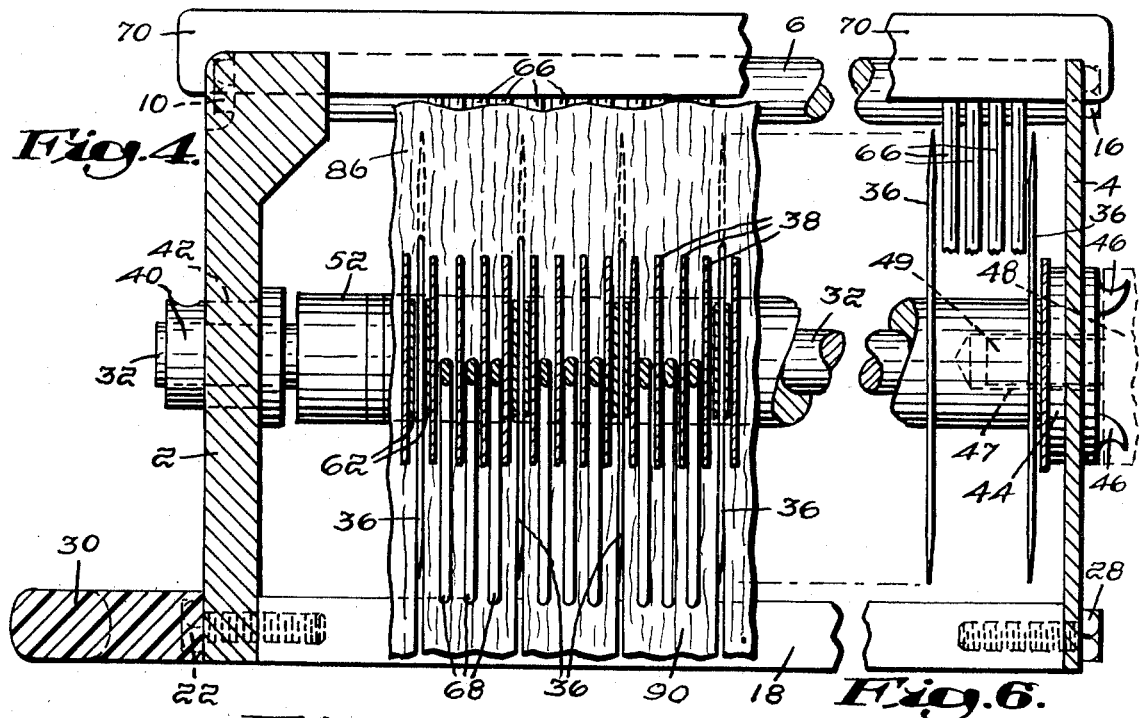
FIG. 4 is a section taken approximately on the line 4—4 of FIGS. 1 and 3.

Referring to FIGS. 1, 3 and 4, the supporting frame work comprises two end plates 2 and 4. These end plates are connected by a pair of upper braces 6 and 8 in the form of round rods drilled and tapped at their ends and secured by bolts 10, 12, 14 and 16. A pair of lower braces 18 and 20 drilled and tapped at their ends are likewise secured to plates 2 and 4 by bolts 22, 24, 26 and 28.

A latching mechanism shown at 30 in FIGS. 1 and 3 is a conventional device used for holding the unit securely in the housing and constitutes no part of the invention. Any other convenient means for securing the unit in the housing could be used.

Extending between the two end plates 2 and 4 are a pair of parallel shafts 32 and 34. Shaft 32 carries a plurality of spaced disc cutters 36, while shaft 34 carries a plurality of spaced penetrating blades 38. The left end of shaft 32, as viewed in FIGS. 1, 3 and 4, is mounted in a bearing 40 located in a suitable opening 42 in end plate 2.

The right hand end of shaft 32 (see FIG. 4) is fixed securely to an enlarged drive disc 44 having dogs 46 on its outer face for connection with suitable driving means 48. The right end of shaft 32 centrally drilled as at 47 is supported by a cooperating extension 49 of the driving means and is free of engagement with end plate 4 as can be seen in FIG. 3.

The disc cutters 36 have centrally located apertures allowing them to be fitted snugly on shaft 32. The cutters 36 are spaced by cylindrical spacers 50 whose longitudinal dimension is determined by the width of the strips to be cut. In FIG. 1 there are shown eleven disc cutters. The cutter at the far right rests directly against drive disc 44. A nut 52, threaded on the other end of shaft 32, when screwed up tightly holds the cutters 36 and intermediate spacers 50 against rotation with respect to shaft 32.

The left end of shaft 34 (see FIGS. 1 and 2) which carries the penetrating blades 38 is similarly mounted in a bearing 54 carried by the end plate 2. The right end of shaft 34 is secured to a drive disc 56 similar to drive disc 44 at the right end of shaft 32. Drive disc 56 likewise has a pair of dogs 58 for engagement with a driving means 59 which in conventional practice is geared to driving means 48 for shaft 32. Driving means 59 supports the right end of shaft 34 in the same manner that driving means 48 supports shaft 32 so that it runs free of engagement with end frame 4 as illustrated in FIG. 3.

Figure 2:
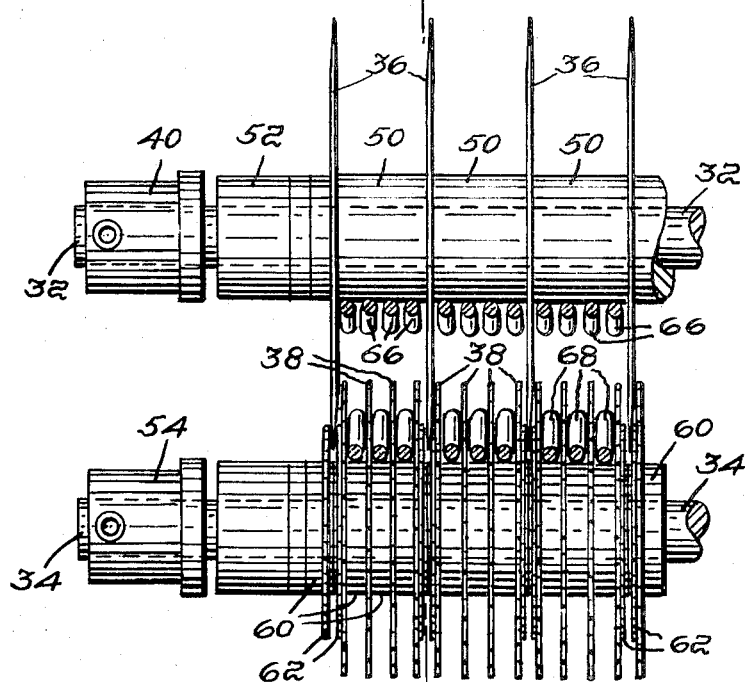
FIG. 2 is a detailed plan view showing the relationship of the cutting discs, penetrating blades and their related meat guiding means, and the left side shaft bearings.

It will be noted in FIGS. 1 and 2 that between each pair of disc cutters 36 there are four penetrating blades 38. In the preferred construction in which the shafts 32 and 34 rotate at the same speed, the cutting discs 36 and 34 are substantially larger in diameter than the penetrating blades 38. The four penetrating blades between each pair of cutters 36 are separated from each other by spacers 60.

The spacers between those penetrating blades 38 that straddle disc cutters 36 are of a special construction. This can be seen in FIGS. 1, 2 and 3. It will be observed that there are four very thin spacers of which the outside pair numbered 62 are of larger diameter than the inside pair 64. The spacing of shafts 32 and 34 and the diameters of disc cutters 36 and penetrating blades 38 is such that the disc cutters 36 enter the narrow space between the large diameter thin spacers 62. That is to say, there is always in all forms of the invention a positive overlap not only between the disc cutters 36 and penetrating blades 38, but also of the disc cutters 36 and the circular spacing elements 62. This construction ensures that the cutting of the meat by disc cutters 36 will be sharp and clean all the way through. If the large diameter circular spacers 62 and smaller spacers 64 were omitted and replaced by spacers 60, the meat could be forced down by cutters 36 toward spacers 60 with the possibility that the strips would not be completely severed.

In order to guide the descending slab of meat along a proper path, conventional guiding means are used. In a preferred form, the guiding means consists of two sets of fingers indicated at 66 and 68. The guiding fingers 66 are secured at their upper ends in a header 70, while the guiding fingers 68 are secured in a header 72. There are four closely spaced fingers 66 between each pair of disc cutters 36, while there is a single finger 68 between each pair of penetrating blades 38 between cutters 36. As shown in FIG. 3, the aligned fingers 66 and 68 taper downwardly toward each other, with the fingers 66 resting on spacers 50 and the fingers 68 resting on spacers 60. The header 70 resides in appropriate slots 74 and 76 in end plates 2 and 4, and the header 72 resides in slots 78 and 80 in end plates 2 and 4. If it is desired to change the spacing between fingers 66 and 68, the header 72 as shown in FIG. 3 may be placed in a second slot 82 in end plate 4, as illustrated in FIG. 3. The other end of header 72 would then be placed in a correspondingly aligned slot 84 in end plate 2. The guiding means just described is conventional.

The penetrating blades 38 are shown as having tapered sharpened teeth flat at their ends to produce a substantial puncture in the meat. As best shown in FIG. 3, a slab of meat 86 is started downwardly between the guide fingers 66 and 68. The leading end of the meat is immediately caught between the disc cutters 36 and the penetrating blades 38. The penetrating blades rotating counterclockwise as viewed in FIG. 3 enter the meat and propel it downwardly at a fixed speed equal to the peripheral speed of penetrating blades 38. In the meanwhile, the disc cutters 36 moving clockwise as viewed in FIG. 3 at a higher peripheral speed than blades 38 slice into the meat, passing completely therethrough to cut the slab 86 into a plurality of vertical strips 90 which will have been punctured on one side by the teeth 88 of the penetrating blades 38. The depth and number of penetrations of teeth 88 into the meat is, of course, controlled by the dimensions of the teeth. In all arrangements, however, disc cutters 36 will overlap the closely spaced circular elements 62. The cut strips of meat are collected on a suitable platform below the unit.

Each strip of meat 90 shown in FIG. 4 as it is originally cut has been punctured by the penetrating blades 38 on one side only. The strip may be used in this condition, or it may be further cut by hand into smaller pieces. Preferably, however, the strip may be turned to horizontal position and reinserted in the machine where it will then be cut into cubes as indicated in FIGS. 5 and 6.

Figure 5:
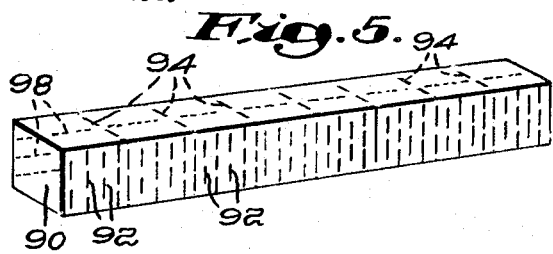
FIG. 5 is illustrative of a tenderized strip of meat about to be cut into cubes, the dotted lines on the upper surface representing the new cuts to be made.
Figure 6:
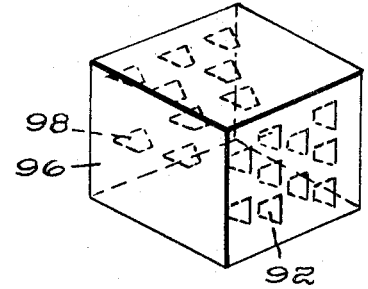
FIG. 6 illustrates a finished tenderized cube of meat that has been additionally tenderized by the penetrating blades on an opposite surface while being cut from the original strip.

In FIG. 5, the lines 94 indicate the course the disc cutters 36 will take to produce the cubes 96 shown in FIG. 6.

The dotted lines 98 in FIGS. 5 and 6 indicate the initial punctures made by the penetrating blades 38 when the meat was first cut into the vertical strips. Lines 92 indicate the additional punctures that will be made by blades 38 when the strips 90 are cut into cubes 96. The cubes 96 having twice as many punctures will be of greater tenderness when cooked.

Figure 7:
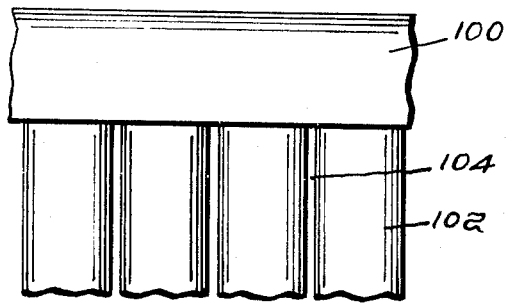
FIG. 7 shows a modified form of guide adapted to be used in conjunction with the disc cutters.

A modified guiding means is shown in FIG. 7. This may be substituted for the header 70 and related guiding fingers 66 used between cutters 36. Here the header 100 has depending therefrom a series of guiding fingers 102 each of which is equal to the overall width of four guiding fingers 66. The disc cutters reside in the spaces 104. However, it will be understood that whichever guiding means is used, the result will be the same.

Figure 8:
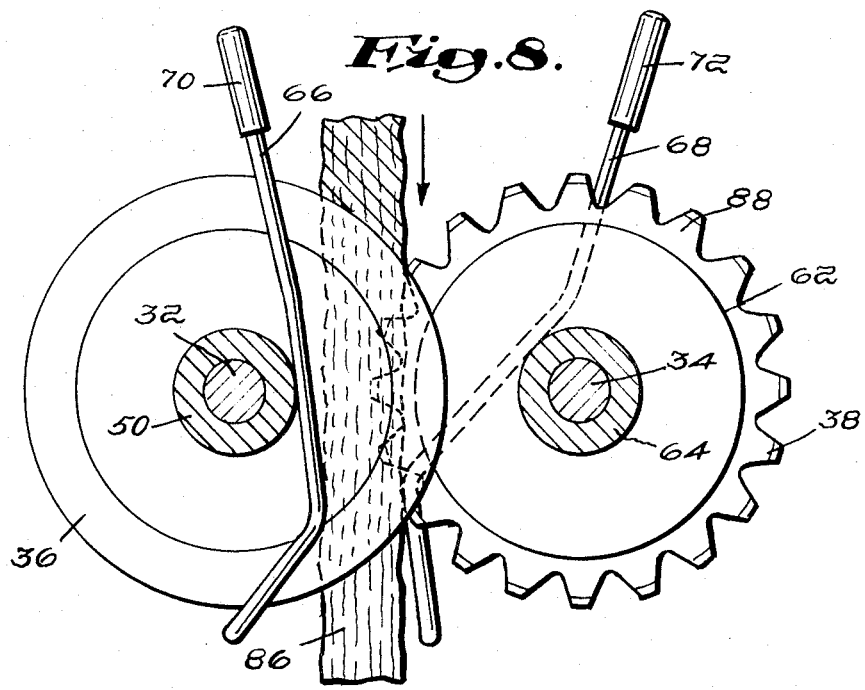
FIG. 8 is illustrative of a modification in which the disc cutters and the penetrating blades are of the same diameter.
Figure 9:
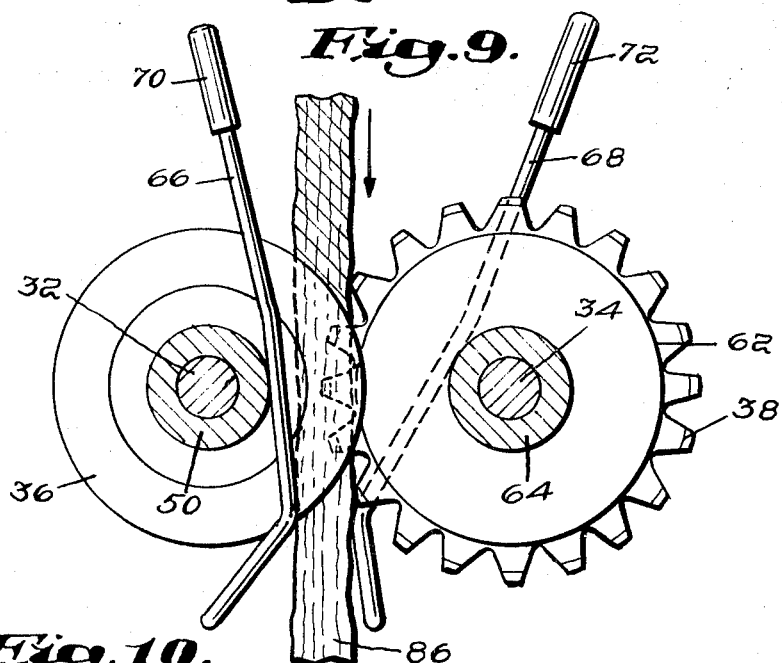
FIG. 9 is another modification in which the disc cutters are of smaller diameter than the penetrating blades.

Two modifications are shown in FIGS. 8 and 9. In FIG. 8 the disc cutters 36 are the same diameter as the penetrating blades 38. In such case, however, it is essential that the shaft 32 rotate faster than shaft 34 so that the peripheral speed of cutters 36 will exceed that of penetrating blades 38. It will also be noted that the cutters 36 overlap the circular spacing elements 62 the same as in FIGS. 1 to 4. The guiding fingers 68 are shaped somewhat differently to accommodate themselves to the larger diameter of penetrating blades 38. There is no difference, however, in the principle of operation. The teeth 88 engage the slab of meat 86 to drive it downwardly at a fixed rate. In the meanwhile, the cutters 36 rotating faster slice completely through the meat to produce the vertical cut strips.

In FIG. 9, the construction shows a disc cutter 36 which is smaller in diameter than the penetrating blades 38. In this case, the shaft 32 must rotate considerably faster than shaft 34 in order to produce a peripheral speed of disc cutters 36 that is greater than that of the penetrating blades 38.

While the preferred form of the invention as to the relative diameters of the disc cutters and penetrating blades is shown in FIGS. 1 to 4 in which the shafts 32 and 34 rotate at equal speeds, it will be understood that with some types of meats it might be advantageous to have the disc cutters larger or smaller thereby to vary the entering angle of the cutter into the meat with possible improved cutting characteristics.

Figure 10:
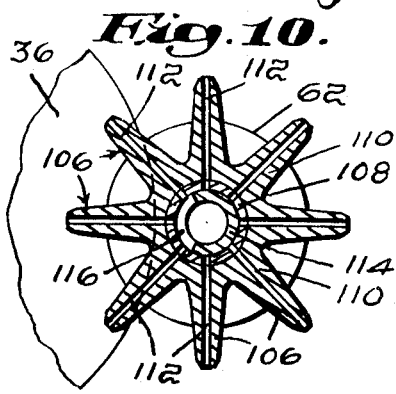
FIG. 10 shows a modified form of penetrating blades in which each blade has a passage therethrough to permit the introduction of a fluid into the meat.
Figure 11:
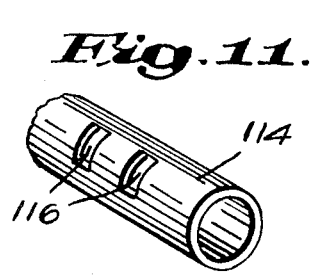
FIG. 11 shows a section of a fixed hollow shaft for use with the rotating penetrating blades of FIG. 10 whereby the fluid can pass through the penetrating blades only when the blades are in position in the meat.

Another modification of the penetrating blades is shown in FIGS. 10 and 11. The penetrating blades 106 shown in FIG. 10 have longer, spike-like teeth 110. These blades 106, spaced axially the same as blades 38, are fixedly mounted on a hollow shaft 108. Each tooth 110 has a longitudinal passage 112 running therethrough in series with a corresponding hole through the wall of hollow shaft 108. Shaft 108 rotates on a hollow fixed shaft 114 which is connected with a source of liquid that is to be forced into the meat. Shaft 108 and the penetrating teeth 110 mounted thereon, function in the same manner as shaft 34 and the related penetrating blades 38.

It will be observed in FIG. 11 that shaft 114 has a series of apertures 116 therealong which apertures are axially aligned with the passages 112 in the teeth 110. As the passages 112 rotate past apertures 116, it follows that the liquid under pressure in hollow fixed shaft 114 can be forced through those teeth 110 which are then in penetrating relation with the meat. Circular spacers 62, the same as those previously described, can be used between those adjacent penetrating blades 106 between which pass the disc cutters 36. Thus, in all of the modified arrangements as shown in FIGS. 8, 9 and 10, the basic requirement that the disc cutters 36 pass between a pair of very closely spaced circular elements 62 is met.

It will also be understood that the spacers 62 and 64 could be formed as a unitary structure instead of the more convenient form of separate annular discs. In another modification (not shown), the penetrating blades 38, straddling disc cutters 36, could, by reduction in the thickness of the elements 62 and 64 or the elimination of some of these elements, be positioned much closer together so that there would be very little clearance between blades 38 and the related inbetween cutter 36, thus to facilitate complete passage of cutters 36 through the meat.

Modifications and further applications of the invention will now be apparent to those skilled in the art without departing from the spirit and scope of the invention.

I claim:

1. A machine for cutting a piece of meat first into strips and subsequently into cubes and simultaneously tenderizing the meat as it is being cut, said machine comprising first and second parallel shafts mounted for rotation in a supporting frame, means for simultaneously rotating said shafts in opposite directions, a plurality of disc cutters mounted on said first shaft and held in spaced relation by spacers dimensioned according to the desired width of the strips to be cut, a plurality of penetrating blades mounted on said second shaft and held in spaced relation by other spacers, said shafts being close enough so that said disc cutters and said penetrating blades are interspersed between each other, the speeds of rotation of said shafts and the diameters of said disc cutters and penetrating blades being such that the peripheral speed of said disc cutters is greater than the peripheral speed of said penetrating blades, means for guiding the movement of said meat along a substantially fixed path between said shafts and for limiting entry of the meat between said penetrating blades without limiting the extent of entry of said disc cutters between said penetrating blades whereby said disc cutters will pass completely through said meat while said penetrating blades pass only partially through said meat thereby to produce said tenderized strips.

2. The construction set forth in claim 1, said shaft rotating means causing said shafts to rotate at equal RPM and the circumference of said disc cutters is greater than the circumference of said penetrating blades.

3. The construction set forth in claim 1, said shaft rotating means causing said shafts to rotate at unequal RPM.

4. The construction set forth in claim 1, each pair of penetrating blades that straddle each said disc cutter having circular spacing elements therebetween, parts of which circular elements overlap the periphery of each said disc cutter in closely spaced relation, the said other spacers between said penetrating blades that do not straddle said disc cutters being narrower than the spacers between said disc cutters.

5. The construction set forth in claim 1, and said meat guiding means limiting movement of the meat toward said second shaft to a position in which the normal distance of the remote side of the meat from the axis of said first shaft is less than the radius of said disc cutters.

6. The construction as set forth in claim 1, the said meat guiding and limiting means comprising fingers located between said penetrating blades and overlapping the peripheries of said disc cutters.

7. The construction set forth in claim 1, and said meat guiding means acting to limit entry of said penetrating blades into said meat to a distance less than the thickness of said meat.

8. The construction set forth in claim 7, said meat guiding means comprising one or more fingers located between said disc cutters and laterally spaced from the periphery of said penetrating blades.

9. The construction set forth in claim 1, said disc cutters being smaller in diameter than said penetrating blades.

10. The construction set forth in claim 1, said disc cutters being the same diameter as said penetrating blades.

11. The construction set forth in claim 1, said disc cutters being larger in diameter than said penetrating blades.

12. The construction as set forth in claim 1, said penetrating blades having their penetrating elements in the form of short tapered spikes.

13. The construction set forth in claim 1, said meat guiding and limiting means being in the form of two sets of guiding fingers, one set of fingers located between the several disc cutters and laterally spaced from the periphery of said penetrating blades, the other set of fingers located between said penetrating blades and overlapping said disc cutters.

14. The construction set forth in claim 1, said penetrating blades having radially extending teeth with passages therethrough and means for forcing a fluid through said passages when said teeth are in penetrating relation with the meat.

15. The construction set forth in claim 1, said second rotating shaft that carries said penetrating blades being hollow, said penetrating blades having radially extending teeth having passages therethrough which communicate with the interior of said second shaft, a third fixed hollow shaft having openings through the wall of limited circumferential extent and axially aligned with said passages, whereby a fluid can be delivered to the interior of the meat when it is penetrated by said blades and means for forcing fluid under pressure through the openings in said third shaft and the passages in said second shaft and blades.

16. The construction set forth in claim 4, the axial length of said other spacers being substantially equal to the axial length of the said spacing elements between the penetrating blades that straddle said disc cutters.

17. The construction set forth in claim 1, the axial distance between each disc cutter and the adjacent straddling penetrating blade being less than the axial distance between those adjacent penetrating blades which do not straddle a disc cutter.

* * * * *